(12) United States Patent
Wessling

(10) Patent No.: US 12,124,398 B2
(45) Date of Patent: Oct. 22, 2024

(54) INPUT/OUTPUT UNIT FOR DATA ACQUISITION WITH A FIELD-BUS SYSTEM

(71) Applicant: Phoenix Contact GmbH & Co. KG, Blomberg (DE)

(72) Inventor: Klaus Wessling, Bueckeburg Nordrhein-Westfalen (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 176 days.

(21) Appl. No.: 17/763,290

(22) PCT Filed: Sep. 29, 2020

(86) PCT No.: PCT/EP2020/077202
§ 371 (c)(1),
(2) Date: Aug. 24, 2022

(87) PCT Pub. No.: WO2021/063932
PCT Pub. Date: Apr. 8, 2021

(65) Prior Publication Data
US 2022/0398211 A1 Dec. 15, 2022

(30) Foreign Application Priority Data
Oct. 2, 2019 (DE) ...................... 10 2019 126 668.8

(51) Int. Cl.
*G06F 13/42* (2006.01)
*G06F 1/12* (2006.01)

(52) U.S. Cl.
CPC ............ *G06F 13/4282* (2013.01); *G06F 1/12* (2013.01)

(58) Field of Classification Search
CPC .................................................... G06F 16/955
See application file for complete search history.

(56) References Cited

U.S. PATENT DOCUMENTS 4,816,996 A 3/1989 Hill et al.
5,928,345 A 7/1999 Tetzlaff et al.
(Continued)

FOREIGN PATENT DOCUMENTS

CN 1237844 A 12/1999
CN 101447915 A 6/2009
(Continued)

*Primary Examiner* — Henry Tsai
*Assistant Examiner* — Juanito C Borromeo
(74) *Attorney, Agent, or Firm* — LEYDIG, VOIT & MAYER, LTD.

(57) ABSTRACT

An input/output unit for data acquisition in a field bus system includes a microcontroller that has at least one integrated synchronous serial bus interface and a control device for direct memory access. A signal source for a digital signal is connectable to a digital data input master input, slave output (MISO) of the at least one synchronous serial bus interface. The first synchronous serial interface reads in the digital signal present at the data input MISO at a first clock rate that corresponds to a data transmission rate of the at least one synchronous serial bus interface. The control device for direct memory access forwards the read-in data words to a buffer memory, and periodically fetches the read-in data words from the buffer memory and forwards the read-in data words to a second synchronous serial bus interface or to another bus interface.

11 Claims, 5 Drawing Sheets

(56) References Cited

U.S. PATENT DOCUMENTS

| | | | |
|---|---|---|---|
| 6,101,567 A | 8/2000 | Kim et al. | |
| 7,509,445 B2 * | 3/2009 | Odom | G01D 9/005 |
| | | | 710/313 |
| 2002/0085562 A1 * | 7/2002 | Hufferd | H04L 69/161 |
| | | | 370/392 |
| 2004/0187097 A1 | 9/2004 | Boelkens et al. | |
| 2007/0245086 A1 | 10/2007 | Odom | |
| 2008/0004726 A1 | 1/2008 | Gehring et al. | |
| 2008/0181242 A1 | 7/2008 | Mechadier | |
| 2009/0024776 A1 | 1/2009 | Cheung et al. | |
| 2011/0060855 A1 | 3/2011 | Kuschke et al. | |
| 2016/0350240 A1 | 12/2016 | Grafton et al. | |

FOREIGN PATENT DOCUMENTS

| | | |
|---|---|---|
| CN | 102047188 A | 5/2011 |
| DE | 10302799 A1 | 9/2004 |
| DE | 69735555 T2 | 1/2007 |
| DE | 102014209625 A1 | 11/2015 |
| DE | 102016109363 A1 | 12/2016 |
| EP | 1873597 A1 | 1/2008 |
| WO | WO 2013184115 A1 | 12/2013 |
| WO | WO 2017196875 A1 | 11/2017 |

* cited by examiner

INPUT/OUTPUT UNIT FOR DATA ACQUISITION WITH A FIELD-BUS SYSTEM

CROSS-REFERENCE TO PRIOR APPLICATIONS

This application is a U.S. National Phase application under 35 U.S.C. § 371 of International Application No. PCT/EP2020/077202, filed on Sep. 29, 2020, and claims benefit to German Patent Application No. DE 10 2019 126 668.8, filed on Oct. 2, 2019. The International Application was published in German on Apr. 8, 2021 as WO 2021/063932 under PCT Article 21(2).

FIELD

The invention relates to an input/output unit for data acquisition in a fieldbus system. The invention further relates to a method for acquiring (or detecting) the course (or sequence) of a digital signal by a microcontroller.

BACKGROUND

Such input/output units are used in a variety of ways in the fieldbus sector. Fieldbus systems are used in automation technology, in process engineering and in general for the control of machines and plants, including robots. There they are used for the acquisition of measured values from sensors, as well as for the output of switching signals for the control of plants. In particular, fieldbus systems have long been used to replace the previously common parallel wiring of binary signals and analog signal transmission for sensors with digital transmission technology.

The input/output units in the fieldbus sector are typically equipped with standard microcontrollers that have so-called "general purpose inputs/outputs" (GPIO port). A typical I/O application is that, for example, the state of a digital input must be sampled at very short time intervals in order to be able to read in the digital data. It is not always possible to transmit the data to the controller of the fieldbus system via the fieldbus with the required time interval of the sampling rate. In this case, an "oversampling" technique is required in conjunction with packetization of the data. A signal is sampled at the required short time interval, the sampled values are temporarily stored in a memory and transmitted cyclically in packets at a high transmission rate and at greater time intervals (depending on the overlaid fieldbus system and its access conditions). As a rule, the state of a GPIO port is "classically" sampled by the central processing unit (CPU) of the microcontroller for this purpose. Every time, when it is time for sampling, the state of the standard GPIO port is captured and thus state by state (bit by bit) is buffered in a register. Hereby, "cumbersome" bit shifting routines have to be called to accumulate the individual states so that they can be sent in packets. The timing of the sampling is usually specified with the help of a timer component of the microcontroller by generating a corresponding clock signal. Timers are also programmed for certain bit or word shift operations, which generate a timer interrupt after the previously determined time has elapsed, through which the corresponding interrupt service routines (ISR) are called, which are processed by the CPU.

Document DE10 2014 209 625 A1 discloses using a serial peripheral interface (SPI) interface with a microcontroller that is also equipped with a direct memory access controller (DMA controller). Data is transferred back and forth between the microcontroller and an external memory via the SPI interface using the DMA controller.

U.S. Pat. No. 2,009,024 776 A1 discloses a microcontroller, which is also equipped with an SPI interface and a DMA controller. The DMA controller transmits the data received from the SPI interface to the CPU core.

The review article on the subject of SPI and DMA transfer "Using DMA with High Performance Peripherals to Maximize System Performance" by John Mangino, W W TMS470 Catalog Applications from SPNA 105, January 2007, discloses as well the use of DMA controllers to reduce the load on the CPU for data transfers via SPI interfaces. To that end, data received from an SPI interface is written to a memory by the external DMA controller.

However, the known solutions have the disadvantage that processor registers are used for intermediate storage when transferring data from an I/O unit to the main memory. First, the data is read by the processor into its internal register, and then moved to the main memory in a further step. To do this, routines triggered by timer modules must be processed, which require many clock cycles in which the processor is not available for the execution of other instructions, and thus the execution speed of running programs is reduced. With the known solutions, in which data is transferred from an SPI interface via direct memory access into the memory, no output of the data via the fieldbus is considered.

SUMMARY

In an embodiment, the present invention provides an input/output unit for data acquisition in a field bus system, comprising a microcontroller that has at least one integrated synchronous serial bus interface and a control device for direct memory access, wherein: a signal source for a digital signal is connectable to a digital data input master input, slave output (MISO) of the at least one synchronous serial bus interface, the first synchronous serial interface reads in the digital signal present at the data input MISO at a first clock rate that corresponds to a data transmission rate of the at least one synchronous serial bus interface, the control device for direct memory access forwards the read-in data words to a buffer memory, and periodically fetches the read-in data words from the buffer memory and forwards the read-in data words to a second synchronous serial bus interface or to another bus interface, wherein the second synchronous serial bus interface or the other bus interface is in communication with a field bus interface, and outputs the data words to the field bus interface at a higher clock rate than the first clock rate during data acquisition by the first synchronous serial interface.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
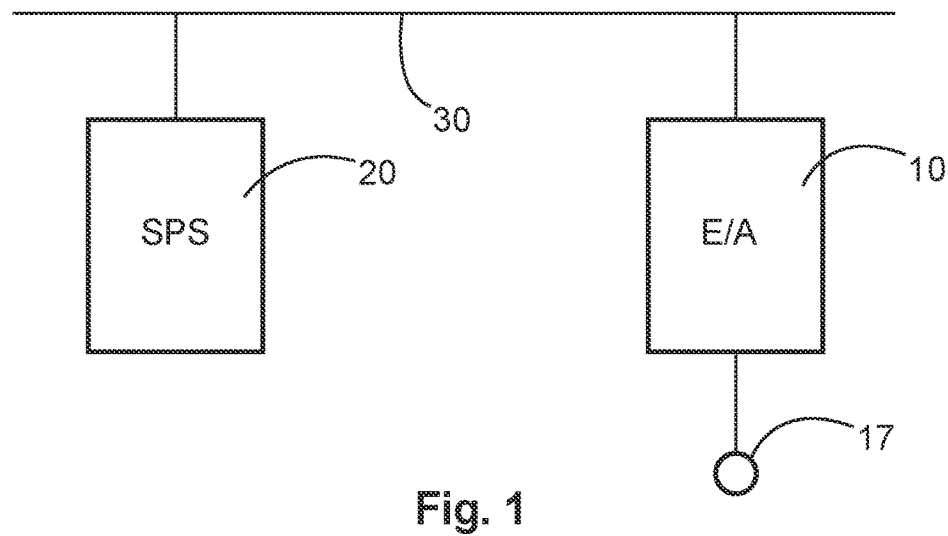
FIG. 1 shows a fieldbus system with the two components I/O unit and controller.

In some embodiments, the present invention provides an improved input/output unit for fieldbus systems. For instance, the present invention provides an input/output unit for data acquisition in fieldbus systems, a method for acquiring the course of a digital signal by a microcontroller, and a microcontroller.

For instance, the present invention provides is an input/output unit for data acquisition in a field bus system, which is equipped with a standard microcontroller having at least one integrated synchronous, serial interface (which may also be referred to as synchronous and serial interface or synchronous serial interface) and a control unit for direct memory access. The solution is characterized in that a signal source for a digital signal is connectable to a data input of the at least one synchronous, serial interface, and that the synchronous, serial interface reads in the data present at the data input at a first clock rate. Preferably, the clock rate for reading in the data corresponds to the data transmission rate of the synchronous, serial interface. Collecting and arranging the individual states (bit by bit) into data packets is thus much easier to implement because the bit shift routines become superfluous and timer interrupts for this purpose are omitted. Furthermore, the solution is that the control unit for direct memory access forwards the read-in data words to a buffer (or buffer memory), and from time to time fetches them from the buffer, and forwards them to a second synchronous serial interface or another bus interface, the second synchronous serial interface or the other bus interface being connected to a fieldbus interface, and outputs the read-in data words at a higher clock rate than the first clock rate during data acquisition by the first synchronous serial interface. The solution offers the advantage that no CPU-heavy routines need to be called to acquire the data at the digital input and to packetize and forward the data over the fieldbus. The CPU is freed from the data acquisition and forwarding process and can perform other tasks. Also, a microcontroller with a less powerful CPU could be used, making the I/O unit less expensive.

In some embodiments, the present invention provides that the data words are fetched from the buffer in packets. The DMA controller can be programmed accordingly, so that no routines have to be processed by the CPU for this purpose either.

The invention can be implemented particularly advantageously with microcontrollers in which the at least two synchronous, serial interfaces are of the type of an SPI interface, corresponding to Serial Peripheral Interface. This interface is very common and is often used in microcontrollers.

In an embodiment, the input/output unit is designed such that the data input is connected to the MISO input, corresponding to Master In, Slave Out, of the first SPI interface and the SCLK, MOSI and CS outputs, corresponding to Serial Clock, Master Out, Slave In and Chip Select, of the first SPI interface are not connected or are connected to ground. The first SPI interface is thus unconventionally operated as a master, although it is not connected to other chips that also contain SPI interfaces.

It is further very advantageous that the input/output unit is programmed so that the second clock rate is higher than the first clock rate by at least such a factor that it corresponds to a multiple of the clock rate of the first clock rate, the multiple being determined by the word length of the data words. This measure guarantees that the acquired data can be transmitted via the fieldbus in packets.

In an extended embodiment, instead of being connected to ground or not connected, the chip select signal is connected to one or more further SPI interfaces, and thus, one or more further SPI interfaces from a number of SPI interfaces is being selected, in which the data present at the data input (MISO) is read in at the first clock rate and forwarded to the buffer. In this way, several digital inputs can be acquired in the same way and output via the field bus.

In an advantageous embodiment, the data packets generated by the input/output unit have a transmission format with a header part (or header), a transport part data field (or transport field), and with a user data field (or payload data field), wherein address information is contained in the header part, a sequence number and/or a time stamp in the transport part data field, and a number of data words compiled in the data packet in the user data field. This allows the chronological order of the data packets to be easily recovered for acquisition of the digital signal in the higher-level controller. The data packets are numbered individually. The packet number is assigned as a sequence number and is thus incremented with each new data packet that is transmitted to the fieldbus interface.

Further advantageous variants concern an input/output unit, wherein the other bus interface is a bus interface of the type of a UART, USART, I2C or USB interface. These are already integrated in some standard microcontrollers.

Another aspect of the invention comprises a method of acquiring the course (or progression) of a digital signal by a microcontroller having at least one integrated synchronous serial bus interface with full duplex functionality. In the method, a digital signal present at a digital data input of the integrated synchronous serial bus interface is read (or read in) by the microcontroller at a clock rate corresponding to a data transmission rate of the synchronous serial bus interface. A special feature here is that the data outputs of the synchronous serial bus interface, which are otherwise connected to the signal source to which the data input is connected to implement full-duplex operation, are not connected to the signal source to establish a full-duplex connection. In this way, the acquisition of the digital signal can be carried out in a very processor-sparing manner.

The integrated synchronous serial bus interface is preferably operated in a master mode in which it sets the clock rate for reading-in the digital signal by itself. If the clock rate is high enough (or great enough), the digital signal can be acquired with correspondingly good resolution.

A further aspect of the invention comprises a microcontroller having at least one integrated synchronous serial bus interface with full duplex functionality, which is characterized in that the microcontroller is adapted to perform the method according to the invention. The microcontroller is adapted, on the one hand, by appropriate wiring of the inputs and outputs of the integrated synchronous serial interface and, on the other hand, by software, in which the data outputs of the integrated synchronous serial interface are not operated.

The present description illustrates the principles of the disclosure according to the invention. It is thus understood that those skilled in the art will be able to conceive various arrangements which, although not explicitly described herein, embody principles of the disclosure according to the invention and are also intended to be protected in their scope.

FIG. 1 shows a simple fieldbus system with only two components. The reference number 10 designates an input/output unit (I/O unit). The reference numbers 20, 30 indicate a controller and the fieldbus itself. The I/O units are used in a variety of ways and are used to record measured values. Sensor signals are often acquired. A sensor is designated with the reference number 17. Different types of sensors can be used, which are used in automation, process engineering or other machine control. These include speed sensors, temperature sensors, light sensors, infrared sensors, touch sensors, microphones, cameras, etc., which list is not exhaustive. The principle of field bus systems is that the measured value acquisition by the I/O unit takes place on site at the various sensors of the machine or plant, but the control of the machine or plant takes place in the control unit 20, e.g. PLC control, which is centrally located. The I/O data is transmitted to the control unit 20 via the field bus 30. The various known fieldbus variants can be considered as fieldbus. Examples of fieldbus systems are Interbus, Profibus, Profinet, Ethernet, EtherCAT, CAN bus, HART, etc.

In addition to I/O units that are used to acquire sensor signals, I/O units are also used to which control signals are sent that then switch specific actuators. Examples are, actuators, pumps, valves, electric motors, etc.

Applications exist for I/O units where signals, e.g. the state of a digital or analog input signal, must be sampled at very short time intervals. For this purpose, standard microcontrollers are often used in the I/O units, which comprise the so-called general purpose inputs/outputs (GPIO). This enables the periodic acquisition/output of digital or analog signals. Because of the increased traffic on the connected field bus 30, on which manifold other data are also transmitted, with corresponding bus allocation conflicts, it is not always possible to transmit the read-in data to the controller in the same way with the required time interval corresponding to the desired sampling rate when reading in the data. For this case, the technique of so-called "oversampling" is used, which, however, should not be confused with the technique of the same name in A/D conversion or D/A conversion. In this process, a signal is sampled at the required short time interval as required by the controller. The data is temporarily stored and transmitted cyclically in blocks at a high transmission rate, but at a greater time interval (depending on the superimposed fieldbus system). This means that data always arrives at the controller in blocks. If the data, which has been transferred at a faster rate, is returned to the required time pattern, the data is then available again in the controller in the same way as it was read into the I/O unit.

Figure 2:
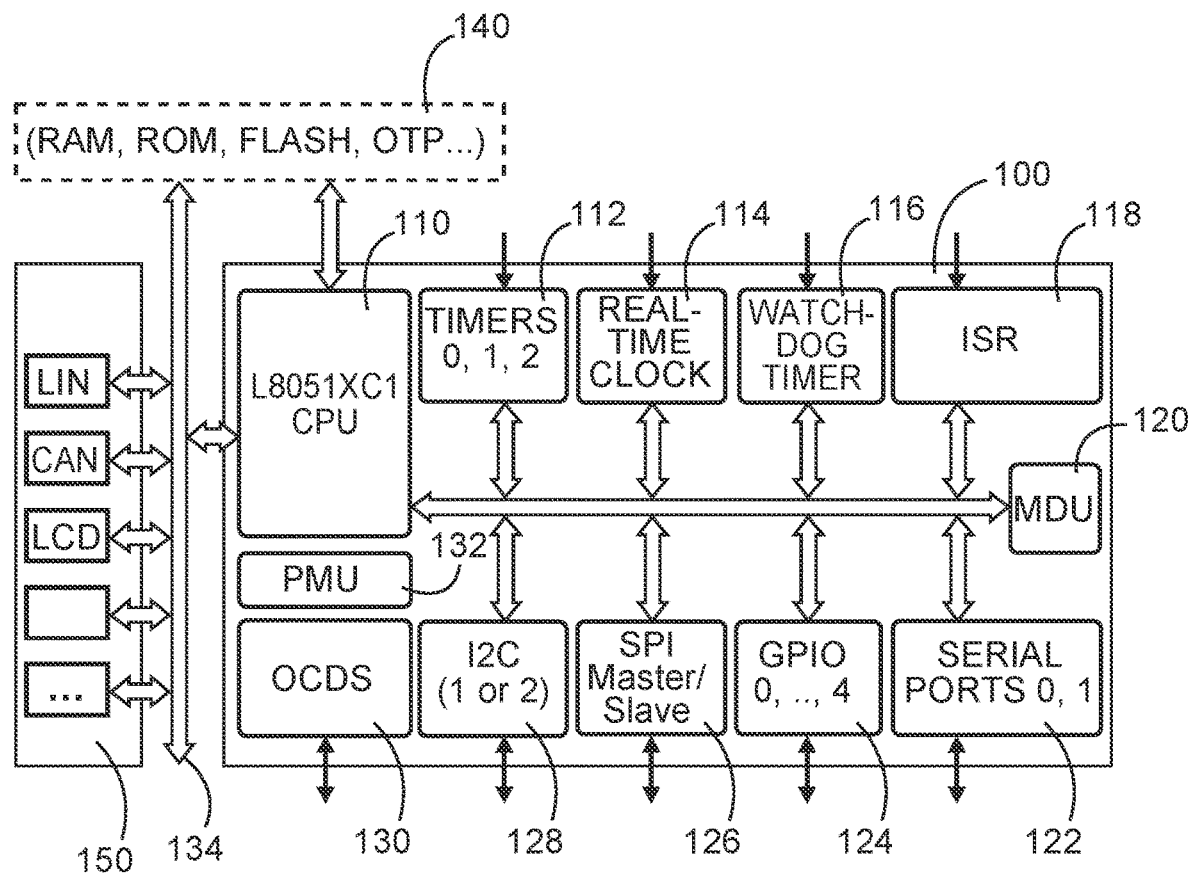
FIG. 2 shows a block diagram of a standard microcontroller that can be used in electronic components for fieldbus systems.

FIG. 2 shows a block diagram of such a standard microcontroller. This is the microcontroller of the type L8051XC1 of the company Intel. The microcontroller is designated with the reference number 100. It contains the following components: CPU 110, timer device 112, real-time clock 114, supervisory circuit 116, interrupt controller 118, co-processor 120, serial interface 122, general-purpose I/O unit 124, SPI interface 126, I2C interface 128, debugging unit 130, and power supply unit 132. The operation in reading digital data is as follows.

In a general example, the state of a digital input, e.g. one of the GPIO inputs, is "classically" sampled for this purpose. Each time it is time to sample, the state of a standard GPIO input 124 is captured and thus buffered state by state (bit by bit) in a buffer memory. In FIG. 2, the buffer memory is allocated in the externally connected memory device 140. Alternatively, however, an internal buffer memory could be provided. In both cases, however, "cumbersome" bit shifting routines must be invoked on the part of the CPU 110 to store the individual bit states so that they can be sent collectively in blocks. The timing of the sampling of the desired GPIO input 124 is usually predetermined by the timer device 112 of the microcontroller 100, such that after a predetermined time has elapsed, a timer interrupt calls the corresponding routine/routines. The same is required when reading data from the buffer memory. The CPU 110 must assemble the data into data packets, which are then transmitted to the fieldbus interface 150 via the external bus 134. Again, the appropriate routines must be called to read the data from the memory device 140 and arrange it into data packets. However, this also places a load on the CPU 110.

Figure 3:
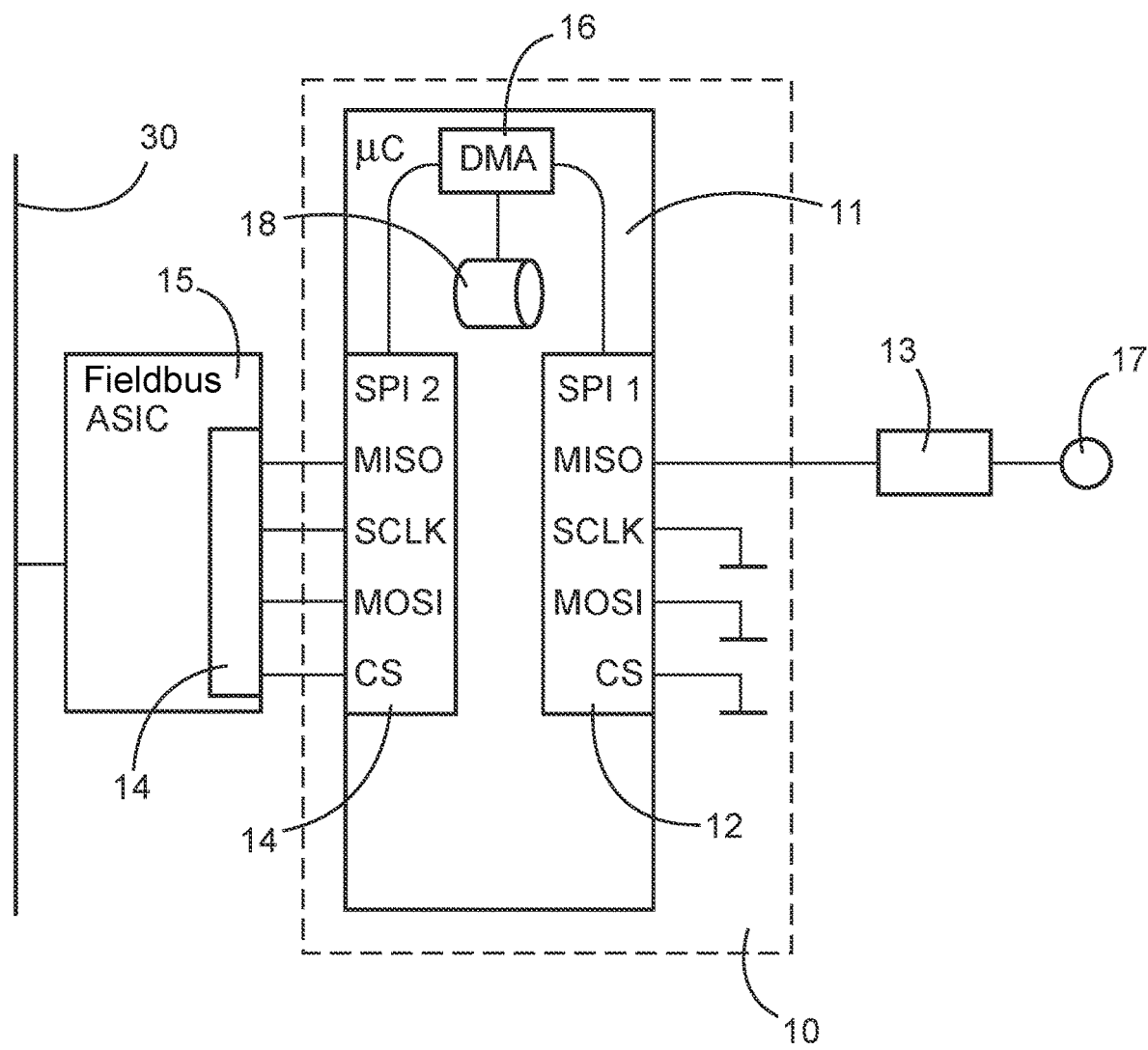
FIG. 3 shows a first block diagram showing an I/O unit using a standard microcontroller in a first manner according to the invention.

FIG. 3 shows a first embodiment of the solution according to the invention how a CPU-sparing (or CPU-saving) I/O operation can be done with a standard microcontroller. Shown in FIG. 3 is another standard microcontroller 11, which may be, for example, of the following commercially available type Cortex Mx, with x as a natural number [0, 1, 2, . . . ]. The commercially available microcontrollers of type STM32T103xC, -xD or -xE from the manufacturer STMicroelectronics are mentioned as an example. The microcontroller is equipped with internal memory, where the buffer memory 18 can also be allocated. The reference number 12 denotes a first SPI interface and the reference number 14 a second SPI interface. CPU-sparing I/O operation is possible by using SPI interfaces 12, 14 for I/O operation. The SPI interfaces 12, 14 correspond to a peripheral component of today's standardized SPI bus, which in some cases is present twice or three times in most microcontrollers. However, this peripheral component is used differently than intended. In the sense of its originally intended mode of operation, no plausible data is generated. However, with the idea described here the necessary oversampling can be realized in a simple way. The prerequisite is that the standard microcontroller has at least one SPI interface. In the example shown, it has two SPI interfaces 12, 14.

The SPI interface (Serial Peripheral Interface) has been standardized. It is a synchronous, serial data bus that can be used to interconnect digital circuits according to the master-slave principle. Further details of the SPI interface are known from U.S. Pat. No. 4,816,996, which is expressly referred to in the detailed disclosure.

There are three common lines to which each participant is connected:
SCLK (Serial Clock), this clock is output from the master for synchronization
MOSI (Master Output, Slave Input), when operating as a master it is an output, when operating as a slave it is an input.
MISO (Master Input, Slave Output), when operating as a master it is an input, when operating as a slave it is an output.

In addition, there may be a fourth common line. This is known as the chip select signal.

CS (Chip Select)

In a multi-slave system the SPI master can select a slave via the CS signal. A chip select signal is not needed for the actual "oversampling" of a digital input.

But it is also possible to "trigger" certain processes in the SPI slave with this signal, so that usable data is already available at the beginning of the data transmission, i.e. at the time when the serial clock signal starts to clock.

Alternatively, this signal can also be used in such a way that, in the case of an I/O unit which has several digital inputs, the chip select signal is used to select, for example, "one out of eight" digital inputs at which "oversampling" is to take place. Alternatively, depending on the "performance" of the microcontroller, "2 out of 8", "3 out of 8" etc. digital inputs could be selected, where the "oversampling" technique is used.

The first SPI interface 12 is used to read in the data. This SPI interface 12 is operated in SPI master mode. The signals at the inputs/outputs SCLK and MOSI (Master Out, Slave In) run "into the void". In the shown case they are simply connected to ground. Only the input/output MISO (Master In, Slave Out) is connected to a signal source 17 (a sensor that outputs a digital signal). It thus functions as a "digital input". The data, which are now read in by the SPI interface 12 operating in SPI master mode, are the states of the digital signal source 17 after level adjustment, which was done with a corresponding level adjustment circuit 13. The data is sampled and read in at the sampling rate corresponding to the data transfer rate of the SPI master 12. Different SCLK frequencies can be programmed. The frequency range that can be set for a conventional SPI interface is between several kHz to several MHz. This data is forwarded via the second SPI interface 14 to the fieldbus interface 15. For this purpose the component for the fieldbus interface 15 also contains an SPI interface 14.

Figure 4:
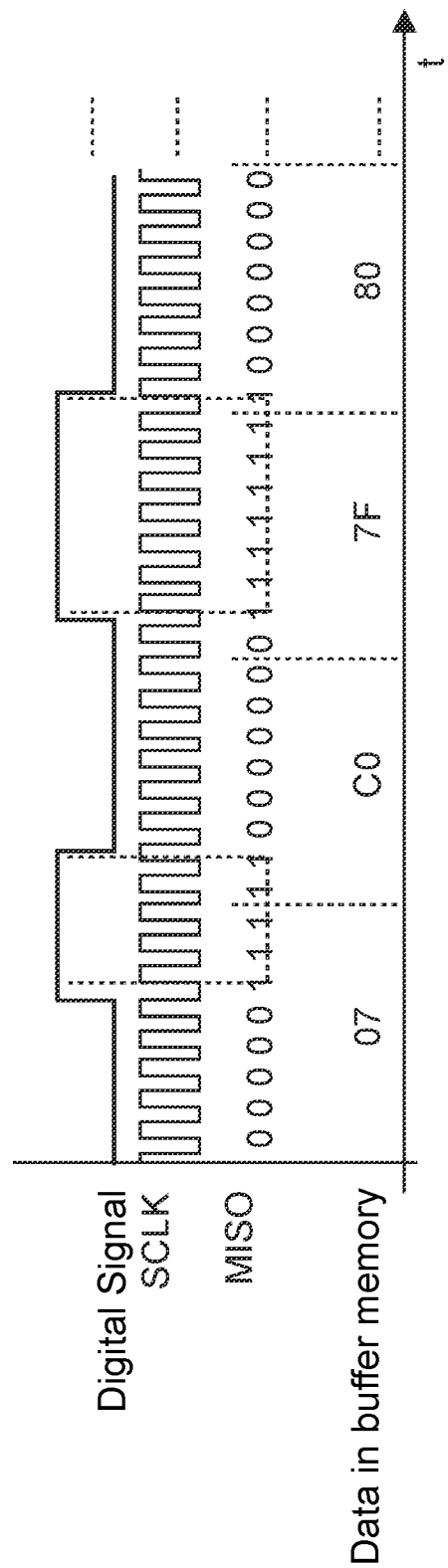
FIG. 4 shows a signal diagram illustrating the "oversampling" technique when reading in a digital signal.

The "oversampling" technique is now explained in more detail with the aid of FIG. 4. The digital signal shown there in the top line is output from signal source 17. Typical examples of such signal sources are sensors that generate a digital output signal. It may be a light barrier, for example. This digital signal is to be acquired (or detected). This is done with the SPI interface 12. The SPI interface 12 is operated in master mode and a clock frequency is set that is high enough (or great enough) to perform oversampling of the digital signal. The SCLK of the clock signal used to sample is shown in the middle row in FIG. 4. The line below shows the sampling values. In each case, 8 samples are combined to form a data word. The data words are indicated in the bottom line in hexadecimal notation. Conventionally, one sampling process would be sufficient to read in the respective digital state. With "oversampling", each digital state is read in several times.

Collecting and arranging the individual bit states read in (bit by bit) to form data words is much easier to implement in this way, because the bit shift routines become superfluous and the timer interrupts required for this, which place a load on the CPU, are no longer necessary. The fetching of the data words from the SPI interface 12 is done by using a DMA device 16 located on the chip of the microcontroller 11, which can write the data into the buffer memory 18 without the involvement of the CPU (not shown).

Figure 5:
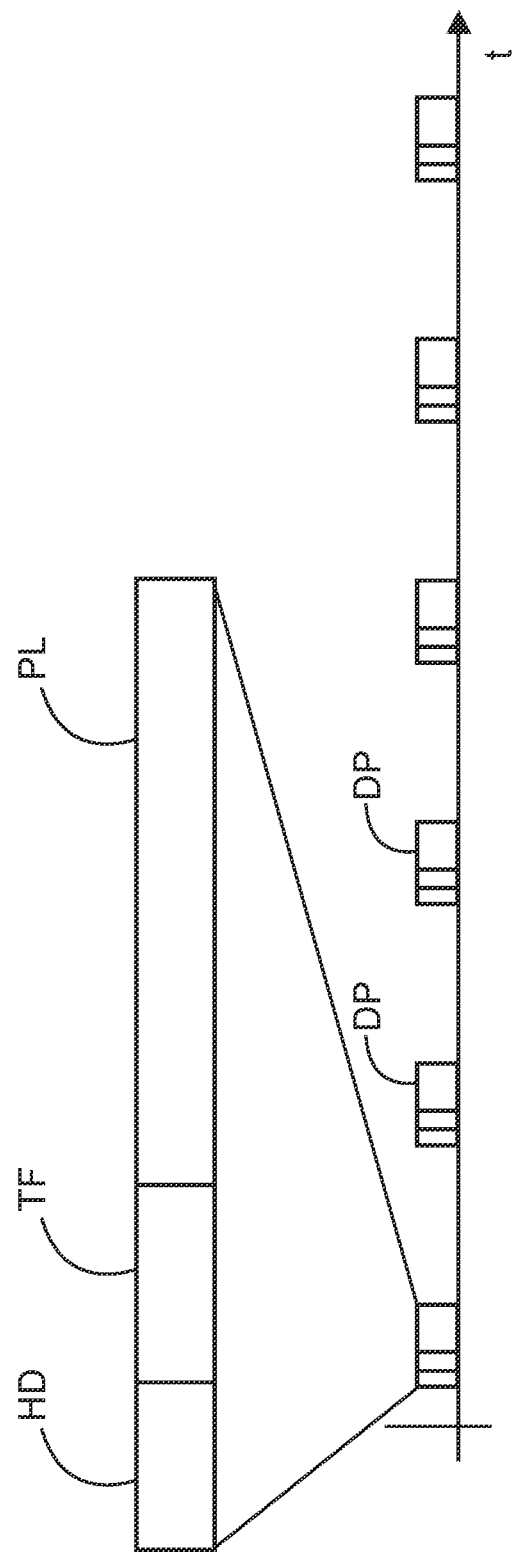
FIG. 5 shows the data transfer process when outputting the read-in digital signal from the second bus interface to a fieldbus interface.

The data is output to the fieldbus interface 15 connected to it via the second SPI interface 14. The DMA module 16 is programmed for this purpose so that it fetches the data from the buffer memory 18 immediately in the correct packet size and outputs it to the second SPI interface 14. In doing so, the second SPI interface 14 is programmed to transmit the fetched data packets to the fieldbus interface 15 at a faster data rate, i.e., a higher SCLK clock rate, in a time-organized manner. The CPU is thus considerably relieved and can make the computing power available for other tasks because the SPI devices 12, 14 and the DMA controller 16 work in the background. It is advantageous if, in addition to the read-in data words, management data, which is fieldbus-dependent, is also transmitted. In order to easily control the chronological order of the data packets of the digital signal in the superimposed controller 20, a time stamp or a packet number can be added. The packet number is assigned as a sequence number and is incremented with each new data packet transmitted to the fieldbus interface. The time stamp can also already be entered. It can alternatively be updated each time the data packet is output to the fieldbus from the fieldbus interface 15. FIG. 5 shows the structure of the data packets DP. The first section of the packet format, i.e. the header part (or header) HD, contains the management data, e.g. the destination and sender addresses. The middle section, i.e. the transport part data field (or transport field) TF, contains the time stamp and the packet number. This is followed by the actual user data field (or payload data field) PL with the data words. For example, there can be 8 data words in the user data field PL. The time interval between the data packets is also shown.

Figure 6:
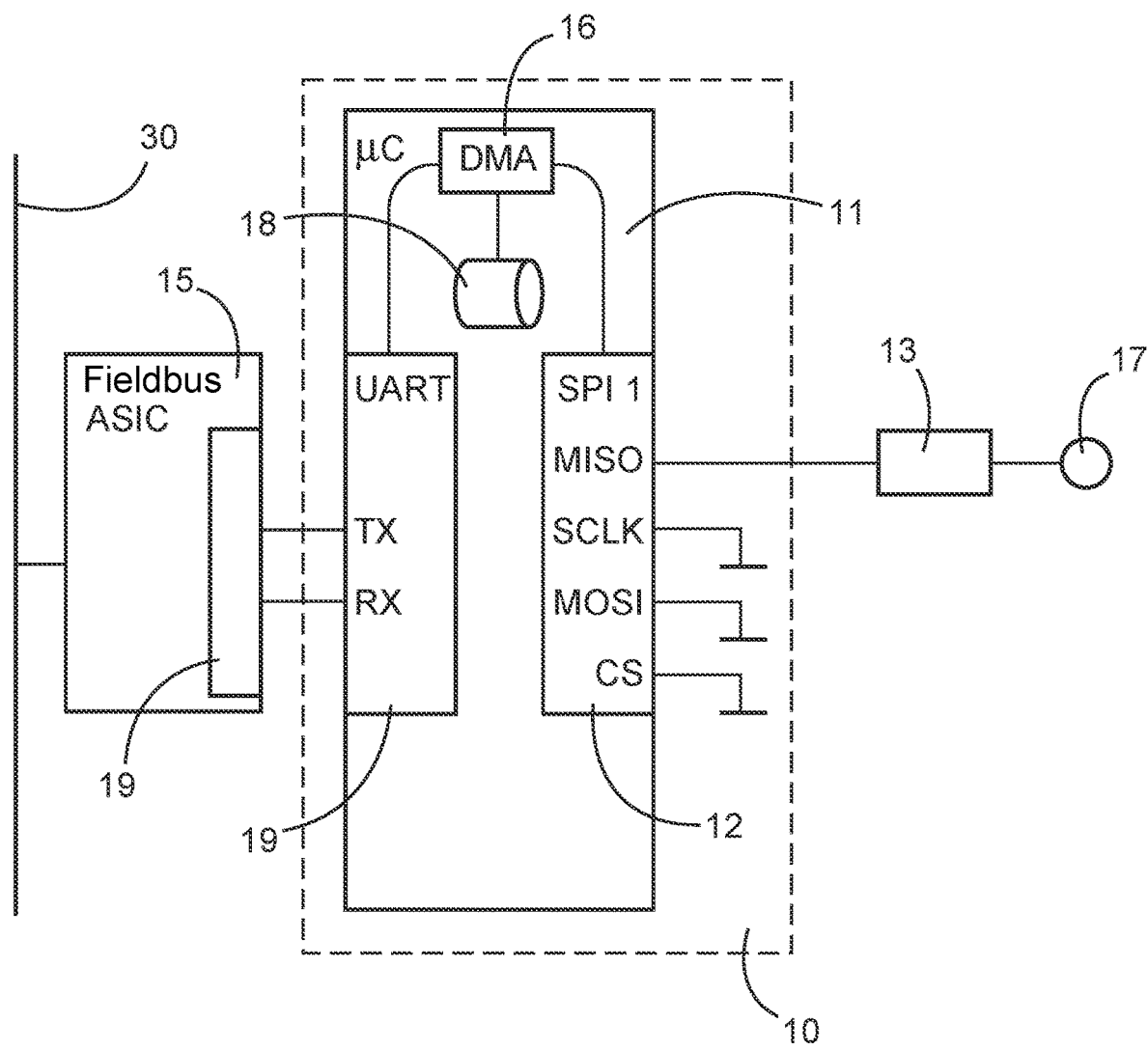
FIG. 6 shows a second block diagram showing an I/O unit using a standard microcontroller in a second manner according to the invention.

FIG. 6 shows a second example of the implementation of the CPU-saving I/O operation with a standard microcontroller according to the invention. Here, the same reference signs denote the same components as in FIG. 3. One difference is that the microcontroller 11 does not use a second SPI interface to output the read-in data words to the fieldbus interface 15, but another serial or parallel bus interface. Shown is that a serial interface in the form of a UART interface is used for this purpose. Accordingly, a UART device 19 is used in the device 15 for the fieldbus interface, which is connected to the UART device 19 via, for example, the TX and RX lines.

In further embodiments, other serial or parallel interfaces could be used. A USART interface, a RS232 interface, an I2C interface, a USB interface, or a FIREWIRE interface are mentioned as examples.

It should be understood that the proposed method and associated devices can be implemented in various forms of hardware, software, firmware, special processors, or a combination thereof. In a preferred embodiment, microcontrollers with integrated RAM memory and integrated I/O interfaces are used. Specialty processors may include application specific integrated circuits (ASICs), reduced instruction set computers (RISC), and/or field programmable gate arrays (FPGAs). Preferably, the proposed method and device is implemented as a combination of hardware and software. Preferably, the software is installed as an application program on a program storage device. Typically, this is a machine based on a computer platform that includes hardware, such as one or more central processing units (CPU), random access memory (RAM), and one or more input/output (I/O) interface(s). The computer platform typically also has an operating system installed thereon. The various processes and functions described herein may be part of the application program or a part that is executed through the operating system.

The disclosure is not limited to the embodiments described herein. There is room for various adaptations and modifications that the person skilled in the art would consider, based on his knowledge of the art, as also pertaining to the disclosure.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A,

The invention claimed is:

1. An input/output unit for data acquisition in a field bus system, comprising:
    a microcontroller that has at least one integrated synchronous serial bus interface and a control device for direct memory access,
    wherein a signal source for a digital signal is connectable to a digital data input master input, slave output (MISO) of a first synchronous serial bus interface of the at least one integrated synchronous serial bus interface,
    wherein the first synchronous serial bus interface reads in the digital signal present at the data input MISO at a first clock rate that corresponds to a data transmission rate of the first synchronous serial bus interface,
    wherein the control device forwards the read-in data words to a buffer memory, and periodically fetches the read-in data words from the buffer memory and forwards the read-in data words to a second synchronous serial bus interface of the at least one integrated synchronous serial bus interface or to another bus interface of the at least one integrated synchronous serial bus interface, and
    wherein the second synchronous serial bus interface or the other bus interface is in communication with a field bus interface, and during data output outputs the data words to the field bus interface at a higher clock rate than the first clock rate during data acquisition by the first synchronous serial bus interface.

2. The input/output unit according to claim 1, wherein the data words are fetched from the buffer memory in packets.

3. The input/output unit according to claim 1, wherein the at least one synchronous serial bus interface comprises a serial peripheral interface (SPI) interface.

4. The input/output unit according to claim 3, wherein the signal source is in communication with the MISO input of the SPI interface and outputs of the SPI interface are not connected or are connected to ground, and
    wherein the outputs of the SPI interface comprise at least one of a Serial Clock (SCLK) signal, a Master Out-Slave In (MOSI) signal, and/or a Chip Select (CS) signal.

5. The input/output unit according to claim 2, wherein the second clock rate is higher than the first clock rate by at least such a factor that the second clock rate corresponds to a multiple of the clock rate of the first clock rate, and
    wherein the multiple is determined based on the word length of the data words.

6. The input/output unit according to claim 4, wherein the CS signal, instead of being connected to ground or being not connected, is used to select one or more further SPI interfaces from a number of SPI interfaces in which the data present at the data input (MISO) is read in at the first clock rate and forwarded to the buffer memory.

7. The input/output unit according to claim 1, wherein the data packets have a transmission format with a header part (HD), a transport part data field (TF) and with a payload data field (PL), and
    wherein address information is included in the header part (HD), a sequence number and/or a time stamp is included in the transport part data field (TF) and a number of data words composed in the data packet is included in the payload data field (PL).

8. The input/output unit according to claim 1, wherein the other bus interface comprises a UART, USART, I2C or USB interface.

9. A method for acquiring a course of a digital signal by a microcontroller that has at least one integrated synchronous serial bus interface with full-duplex functionality, the method comprising:
    reading in, at a first synchronous serial bus interface of the at least one integrated synchronous serial bus interface, a digital signal present at a digital data input master input, slave output (MISO) by the microcontroller at a first clock rate which corresponds to a data transmission rate of the first synchronous serial bus interface, without connecting data outputs of the first synchronous serial bus interface to a signal source to which the digital data input MISO is connected in order to set up a full-duplex connection; and
    outputting during data output, at a second synchronous serial bus interface of the at least one integrated synchronous serial bus interface, the data outputs to a field bus interface at a second clock rate corresponding to a data transmission rate of the second synchronous serial bus interface, the second clock rate during data output being higher than the first clock rate during data acquisition,
    wherein the data outputs comprise at least one of a Serial Clock (SCLK) signal, a Master Out-Slave In (MOSI) signal, and/or a Chip Select (CS) signal.

10. The method according to claim 9, wherein the at least one integrated synchronous serial bus interface is operated in a master operating mode in which the at least one integrated synchronous serial bus interface sets the first clock rate for reading in the digital signal by itself.

11. A microcontroller configured to perform the method according to claim 9, the microcontroller comprising:
    the at least one integrated synchronous serial bus interface.

* * * * *